US011367926B2

United States Patent
Wang et al.

(10) Patent No.: US 11,367,926 B2
(45) Date of Patent: Jun. 21, 2022

(54) COATING SLURRY WITH HIGH ADHESION AND HIGH IONIC CONDUCTIVITY, PREPARATION METHOD THEREOF, AND LITHIUM BATTERY SEPARATOR

(71) Applicant: JIANGSU HORIZON NEW ENERGY TECH CO., LTD., Changzhou (CN)

(72) Inventors: Chenghao Wang, Changzhou (CN); Zhenglin Li, Changzhou (CN); Wenbin Shang, Changzhou (CN); Libin Zhang, Changzhou (CN)

(73) Assignee: JIANGSU HORIZON NEW ENERGY TECH CO., LTD., Changzhou (CN)

( * ) Notice: Subject to any disclaimer, the term of this patent is extended or adjusted under 35 U.S.C. 154(b) by 0 days.

(21) Appl. No.: 17/441,703

(22) PCT Filed: Oct. 27, 2020

(86) PCT No.: PCT/CN2020/123942
§ 371 (c)(1),
(2) Date: Sep. 22, 2021

(87) PCT Pub. No.: WO2021/120857
PCT Pub. Date: Jun. 24, 2021

(65) Prior Publication Data
US 2022/0094016 A1 Mar. 24, 2022

(30) Foreign Application Priority Data
Dec. 18, 2019 (CN) .......................... 201911307324.9

(51) Int. Cl.
*H01M 50/446* (2021.01)
*H01M 50/403* (2021.01)
*H01M 10/0525* (2010.01)

(52) U.S. Cl.
CPC ..... *H01M 50/446* (2021.01); *H01M 10/0525* (2013.01); *H01M 50/403* (2021.01)

(58) Field of Classification Search
CPC ........... H01M 50/446; H01M 10/0525; H01M 50/403
(Continued)

(56) References Cited

U.S. PATENT DOCUMENTS

2011/0281487 A1* 11/2011 Mukai .................... B32B 27/12
442/335

FOREIGN PATENT DOCUMENTS

| CN | 101815740 A | 8/2010 |
| CN | 105047935 A | 11/2015 |

(Continued)

OTHER PUBLICATIONS

Feng Wu, et al., Surface Modification of Li-rich Cathode Materials for Lithium-ion Batteries with PEDOT: PSS Conducting Polymer, ACS Appl. Mater. Interfaces, 2016, 28 pages.
(Continued)

*Primary Examiner* — Gary D Harris
(74) *Attorney, Agent, or Firm* — Bayramoglu Law Offices LLC

(57) ABSTRACT

A coating slurry with high adhesion and high ionic conductivity, a preparation method thereof, and a lithium battery separator are provided. The coating slurry with the high adhesion and the high ionic conductivity includes: PEAE: 1 to 60 parts; a dispersing agent: 0.01 to 10 parts; a wetting agent: 0.01 to 15 parts; and a solvent: 100 parts. The PEAE can be evenly coated on a basal membrane to form a lithium battery separator, which solves the problem that pure PEAE cannot be directly and evenly coated on a separator. The PEAE is coated on the basal membrane for the first time to prepare the lithium battery separator, which ensures that the
(Continued)

lithium battery separator has characteristics of the high adhesion and the high ionic conductivity.

8 Claims, 1 Drawing Sheet

(58) Field of Classification Search
USPC .......................................................... 429/142
See application file for complete search history.

(56) References Cited

FOREIGN PATENT DOCUMENTS

| CN | 105742562 A | 7/2016 |
|---|---|---|
| CN | 108878751 A | 11/2018 |
| CN | 109065803 A | 12/2018 |
| CN | 110970591 A | 4/2020 |

OTHER PUBLICATIONS

Huihui Xu, et al., Conductance Investigation of p-MIECs Fabricated by Poly(3,4-ethylenedioxythiophene), Polyacrylic Acid, Polyethylene Oxide, and Lithium-Ion Salt, Polymer Composites, 2015, pp. 2077-2083.

\* cited by examiner

COATING SLURRY WITH HIGH ADHESION AND HIGH IONIC CONDUCTIVITY, PREPARATION METHOD THEREOF, AND LITHIUM BATTERY SEPARATOR

CROSS REFERENCE TO THE RELATED APPLICATIONS

This application is the national phase entry of International Application No. PCT/CN2020/123942, filed on Oct. 27, 2020, which is based upon and claims priority to Chinese Patent Application No. 201911307324.9, filed on Dec. 18, 2019, the entire contents of which are incorporated herein by reference.

TECHNICAL FIELD

The present disclosure belongs to the technical field of lithium battery separators, and in particular relates to a coating slurry with high adhesion and high ionic conductivity, a preparation method thereof, and a lithium battery separator.

BACKGROUND

With the growing use of lithium-ion batteries (LIBs) in the electric power industry, the energy density and volume of LIBs are becoming increasingly large, resulting in their deformation during use. At present, a typical solution in the prior art is to apply a coating to the lithium battery separator, where the main components of the coating include a polyvinylidene fluoride (PVDF), polyvinyl alcohol (PVA), or acrylic binder. However, such coatings generally have low ionic conductivity and unsatisfactory bonding ability. Consequently, after a lithium battery separator is applied with the coating, the internal resistance of the lithium battery increases greatly, which seriously affects the rate performance and cycling performance of the lithium battery.

In order to eliminate the negative impact on the application of coated lithium battery separators, the present disclosure provides a coating slurry with high adhesion and high ionic conductivity, where the coating slurry featuring high adhesion and high ionic conductivity is prepared from PEAE (as a main component), a dispersing agent, a wetting agent, and a solvent.

SUMMARY

The present disclosure is intended to provide a coating slurry with high adhesion and high ionic conductivity, a preparation method thereof, and a lithium battery separator.

In order to solve the above technical problem, the present disclosure provides a coating slurry, including: PEAE: 1 to 60 parts; a dispersing agent: 0.01 to 10 parts; a wetting agent: 0.01 to 15 parts; and a solvent: 100 parts.

Further, the PEAE may be prepared from PEDOT, PEO, and PAA through in-situ polymerization.

Further, the in-situ polymerization may include: dissolving the PEDOT in a PSS aqueous dispersion, adding a PEO powder, and stirring a resulting mixture at room temperature until solids are completely dissolved; adding solid sodium bisulfate, stirring for dissolution, and heating a resulting mixture to 70° C.; and under the protection of nitrogen, simultaneously adding an ammonium persulfate (APS) aqueous solution and an acrylic monomer dropwise to allow a reaction.

Further, the PEDOT, PEO, and PAA may have a mass ratio of 1:(0.5-0.9):(0.6-1.0). Further, the dispersing agent may include an organic dispersing agent and/or an inorganic dispersing agent; the organic dispersing agent may include one or more selected from the group consisting of tris(2-ethylhexyl)phosphate (TEHP), sodium dodecyl sulfate (SDS), methylpentanol, cellulose derivatives, polyacrylamide (PAM), guar gum, and fatty acid polyethylene glycol ester; and the inorganic dispersing agent may include at least one selected from the group consisting of silicate and alkali-metal phosphate.

Further, the alkali-metal phosphate may include at least one selected from the group consisting of sodium tripolyphosphate (STPP), sodium hexametaphosphate (SHMP), and sodium pyrophosphate.

Further, the wetting agent may include one or more selected from the group consisting of an anionic surfactant, a nonionic surfactant, and a neutral surfactant.

In another aspect, the present disclosure also provides a preparation method of a coating slurry, including: mixing PEAE, a dispersing agent, a wetting agent, and a solvent, and subjecting a resulting mixture to dispersion to obtain the coating slurry.

Further, a method for the dispersion may include at least one selected from the group consisting of stirring by a stirrer, sanding by a sand mill, and ultrasonic vibration.

In another aspect, the present disclosure also provides a lithium battery separator, including: a basal membrane and a coating on the basal membrane, where the coating is formed by coating the coating slurry described above.

Beneficial effects of the present disclosure: The present disclosure provides a coating slurry, a preparation method thereof, and a lithium battery separator. The coating slurry is prepared from PEAE (as a main component), a dispersing agent, a wetting agent, and a solvent, which can ensure that PEAE is evenly coated on a basal membrane to form a lithium battery separator. The present disclosure can not only solve the problem that pure PEAE cannot be directly and evenly coated on a separator, but also improve the adhesion and ionic conductivity of a lithium battery separator through the high adhesion and high ionic conductivity of PEAE. PEAE is coated on a basal membrane for the first time to prepare a lithium battery separator, which ensures that the lithium battery separator has the characteristics of high adhesion and high ionic conductivity.

Other features and advantages of the present disclosure will be described in the following description, and some of these will become apparent from the description or be understood by implementing the present disclosure. The objectives and other advantages of the present disclosure can be implemented or obtained by structures specifically indicated in the description, claims, and accompanying drawings.

In order to make the above objectives, features, and advantages of the present disclosure more understandable, the present disclosure is described in detail below using preferred examples with reference to the accompanying drawings.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementa

DETAILED DESCRIPTION OF THE EMBODIMENTS

Figure 1:
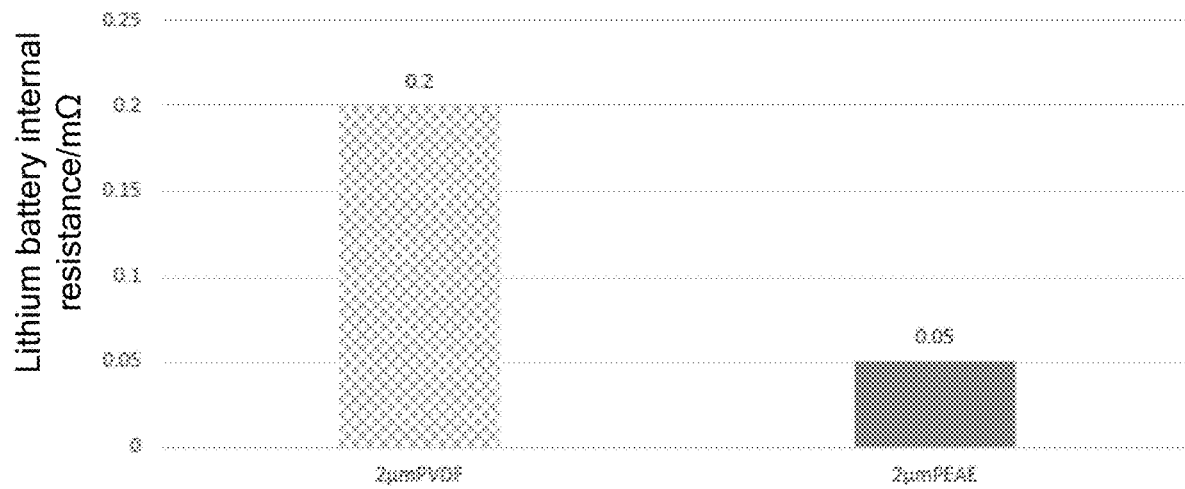
- FIG. 1 is a comparison diagram of the internal resistance test results of lithium batteries.

In order to make the objectives, technical solutions, and advantages of the examples of the present disclosure clearer, the technical solutions in the present disclosure are described clearly and completely below with reference to the accompanying drawings. Apparently, the described examples are some rather than all of the examples. All other examples obtained by a person of ordinary skill in the art based on the examples of the present disclosure without creative efforts shall fall within the protection scope of the present disclosure.

The proper nouns or abbreviations used in this application are defined or explained below, as shown in Table 1:

TABLE 1

| Term explanation | |
|---|---|
| Acronym or Abbreviation | Definition |
| PVDF | Polyvinylidene fluoride |
| PVA | Polyvinyl alcohol |
| PEAE | Ternary composite conductive adhesive |
| PEDOT | Poly(3,4-ethylenedioxythiophene) |
| PEO | Polyethylene oxide |
| PAA | Polyacrylic acid |
| PE | Polyethylene |
| PSS | Sodium polystyrene sulfonate |

Example 1

The coating slurry of Example 1 includes the following raw materials in parts by mass: PEAE: 1 to 60 parts; a dispersing agent: 0.01 to 10 parts; a wetting agent: 0.01 to 15 parts; and a solvent: 100 parts.

Optionally, the solvent such as water can provide a carrier for the PEAE. Under the action of the wetting agent and the dispersing agent, the PEAE can be evenly dispersed in water to ensure the evenness of the coating slurry, thereby ensuring the coating effect on a basal membrane, namely, ensuring the stability of the electrical performance of a lithium battery.

Optionally, the coating slurry includes the following raw materials in parts by mass: PEAE: 25 parts; a dispersing agent: 1 part; a wetting agent: 6 parts; and a solvent: 100 parts.

Optionally, the coating slurry includes the following raw materials in parts by mass: PEAE: 45 parts; a dispersing agent: 8 parts; a wetting agent: 12 parts; and a solvent: 100 parts.

Optionally, the coating slurry includes the following raw materials in parts by mass: PEAE: 10 parts; a dispersing agent: 0.1 part; a wetting agent: 0.5 part; and a solvent: 100 parts.

Due to the essential characteristics of PEAE such as powdered form and insolubility in water or other solvents, PEAE cannot be directly and evenly coated on a basal membrane. As a result, PEAE with high adhesion and ionic conductivity cannot be applied to lithium battery separators. Even if PEAE is coated, a resulting lithium battery separator will have poor stability due to the unevenness of PEAE, and thus can hardly be used in actual production. Therefore, how to achieve the uniform distribution of PEAE at a battery interface is one of the innovations of the present disclosure, that is, PEAE needs to be used in combination with the dispersing agent, wetting agent, and solvent in this solution.

The coating slurry of Example 1 is prepared from PEAE (as the main component), a dispersing agent, a wetting agent, and a solvent. PEAE is coated on a basal membrane for the first time to achieve the uniform distribution of PEAE on a battery interface, and thus the ionic conductivity of a lithium battery separator can be improved through the high ionic conductivity and high adhesion of PEAE, which solves the problem that pure PEAE cannot be directly and evenly coated on a separator and improves the high ionic conductivity of the lithium battery separator. As an optional implementation of PEAE:

The PEAE may be prepared from PEDOT, PEO, and PAA through in-situ polymerization. Specifically, the in-situ polymerization may include: dissolving the PEDOT in a PSS aqueous dispersion, adding a PEO powder, and stirring a resulting mixture at room temperature until solids are completely dissolved; adding solid sodium bisulfate, stirring for dissolution, and heating a resulting mixture to 70° C.; and under the protection of nitrogen, simultaneously adding an APS aqueous solution and an acrylic monomer dropwise to allow a reaction to obtain the PEAE.

The PEDOT, PEO, and PAA may have a mass ratio preferably of 1:(0.5-0.9):(0.6-1.0) and more preferably of 1:0.6:0.7 or 1:0.8:0.8.

In this implementation, high ionic conductivity of PEAE can be guaranteed by controlling a content ratio of PEDOT, PEO, and PAA. There is no need to consider the adhesion and dispersibility of PEAE in the preparation of PEAE, and PEAE only needs to be used in combination with proper amounts of the dispersing agent, the wetting agent, and the solvent to ensure the high ionic conductivity of a lithium battery separator.

As an optional implementation of the dispersing agent:

The dispersing agent may include an organic dispersing agent and/or an inorganic dispersing agent; the organic dispersing agent includes, but is not limited to, one or more selected from the group consisting of TEHP, SDS, methylpentanol, cellulose derivatives, PAM, guar gum, and fatty acid polyethylene glycol ester; and the inorganic dispersing agent includes, but is not limited to, at least one selected from the group consisting of silicate and alkali-metal phosphate.

Optionally, the alkali-metal phosphate includes, but is not limited to, at least one selected from the group consisting of STPP, SHMP, and sodium pyrophosphate.

The dispersing agent of this implementation is different from the conventional dispersing agent in that PEAE can be evenly dispersed in water, which avoids agglomeration of PEAE particles and facilitates the uniform distribution of PEAE in the coating slurry. Therefore, the coating slurry can be coated on a surface of a basal membrane to form a lithium battery separator whose surface is evenly covered with PEAE, thereby ensuring the stability of the lithium battery separator.

As an optional implementation of the wetting agent:

The wetting agent includes, but is not limited to, one or more selected from the group consisting of an anionic surfactant, a nonionic surfactant, and a neutral surfactant. The wetting agent mainly solves the problem of excessive surface tension of the coating slurry, which facilitates the coating on a basal membrane to form a lithium battery separator and can also improve the adhesion between the coating slurry and the basal membrane.

Example 2

On the basis of Example 1, Example 2 also provides a preparation method of the coating slurry, including: mixing PEAE, a dispersing agent, a wetting agent, and a solvent, and subjecting a resulting mixture to dispersion to obtain the coating slurry.

Optionally, a method for the dispersion may include at least one selected from the group consisting of stirring by a stirrer, sanding by a sand mill, and ultrasonic vibration.

The component contents and the specific implementation process for the coating slurry can be seen in the relevant description in Example 1, which will not be repeated here.

Example 3

On the basis of Examples 1 or 2, Example 3 also provides a lithium battery separator, including: a basal membrane and a coating on the basal membrane, where the coating is formed by coating the coating slurry described above.

Optionally, the basal membrane includes, but is not limited to, a PE membrane, a PP membrane, a PI membrane, a PET membrane, and a non-woven membrane.

The component contents and the specific implementation process for the coating slurry can be seen in the relevant description in Examples 1 and 2, which will not be repeated here.

Example 4

(1) PEDOT, PEO, and PAA were weighed at a mass ratio of 1:0.5:0.6 to prepare PEAE through in-situ polymerization;

(2) 40 wt % of PEAE, 3 wt % of a dispersing agent, 0.3 wt % of a wetting agent, and an appropriate amount of water were mixed, and a resulting mixture was subjected to dispersion using a sand mill to obtain a coating slurry; and (3) the coating slurry prepared in (2) was coated on a PE membrane with a thickness of 2 μm to obtain a lithium battery separator.

Example 5

(1) PEDOT, PEO, and PAA were weighed at a mass ratio of 1:0.9:0.8 to prepare PEAE through in-situ polymerization;

(2) 1 wt % of PEAE, 0.01 wt % of a dispersing agent, 0.01 wt % of a wetting agent, and an appropriate amount of water were mixed, and a resulting mixture was subjected to dispersion using a sand mill to obtain a coating slurry; and (3) the coating slurry prepared in (2) was coated on a PE membrane with a thickness of 2 μm to obtain a lithium battery separator.

Example 6

(1) PEDOT, PEO, and PAA were weighed at a mass ratio of 1:0.6:1.0 to prepare PEAE through in-situ polymerization;

(2) 60 wt % of PEAE, 10 wt % of a dispersing agent, 15 wt % of a wetting agent, and an appropriate amount of water were mixed, and a resulting mixture was subjected to dispersion using a sand mill to obtain a coating slurry; and (3) the coating slurry prepared in (2) was coated on a PE membrane with a thickness of 2 μm to obtain a lithium battery separator.

Example 7

(1) PEDOT, PEO, and PAA were weighed at a mass ratio of 1:0.7:0.8 to prepare PEAE through in-situ polymerization;

(2) 30 wt % of PEAE, 2 wt % of a dispersing agent, 8 wt % of a wetting agent, and an appropriate amount of water were mixed, and a resulting mixture was subjected to dispersion using a sand mill to obtain a coating slurry; and (3) the coating slurry prepared in (2) was coated on a PE membrane with a thickness of 2 μm to obtain a lithium battery separator.

Example 8

(1) PEDOT, PEO, and PAA were weighed at a mass ratio of 1:0.8:0.9 to prepare PEAE through in-situ polymerization;

(2) 5 wt % of PEAE, 0.05 wt % of a dispersing agent, 0.1 wt % of a wetting agent, and an appropriate amount of water were mixed, and a resulting mixture was subjected to dispersion using a sand mill to obtain a coating slurry; and (3) the coating slurry prepared in (2) was coated on a PE membrane with a thickness of 2 μm to obtain a lithium battery separator.

Example 9

(1) PEDOT, PEO, and PAA were weighed at a mass ratio of 1:0.6:0.7 to prepare PEAE through in-situ polymerization;

(2) 15 wt % of PEAE, 5 wt % of a dispersing agent, 9 wt % of a wetting agent, and an appropriate amount of water were mixed, and a resulting mixture was subjected to dispersion using a sand mill to obtain a coating slurry; and (3) the coating slurry prepared in (2) was coated on a PE membrane with a thickness of 2 μm to obtain a lithium battery separator.

Comparative Example (1) 5 wt % of PVDF, 0.05 wt % of a dispersing agent, 0.1 wt % of a wetting agent, and an appropriate amount of water were mixed, and a resulting mixture was subjected to dispersion using a sand mill to obtain an existing PVDF coating slurry; and (2) the existing PVDF coating slurry was coated on a PE membrane with a thickness of 2 μm to obtain a lithium battery separator.

Example 10

FIG. 1 is a comparison diagram of the internal resistance test results of lithium batteries.

Figure 2:
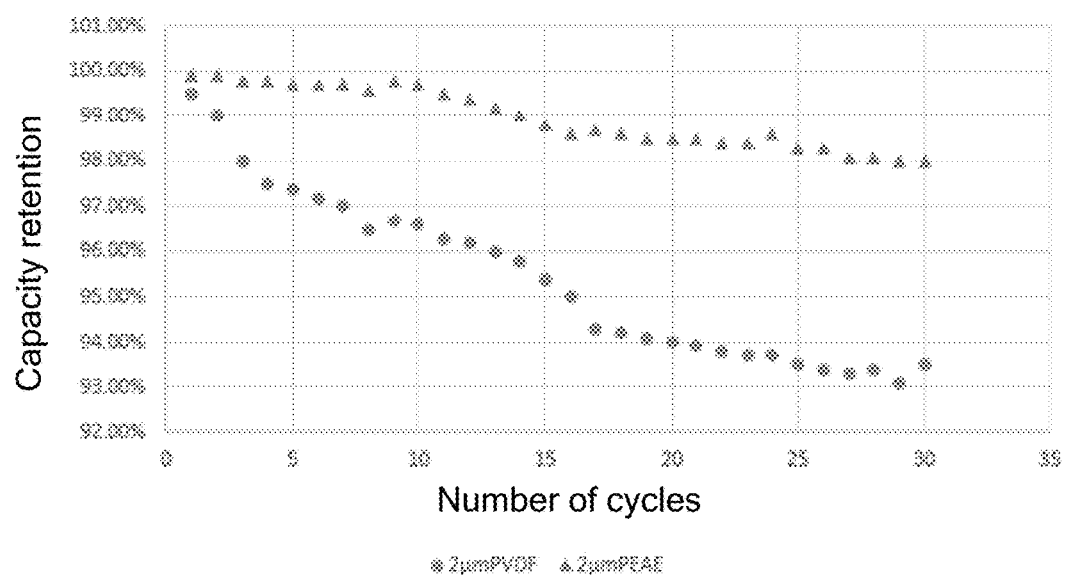
FIG. 2 is a comparison diagram of the capacity retention test results of lithium batteries.

FIG. 2 is a comparison diagram of the capacity retention test results of lithium batteries.

In Example 10, the relevant electrical properties (including internal resistance and capacity retention) were tested for lithium batteries prepared in Example 4 and comparative example, separately. Test results were shown in Table 2.

TABLE 2

Comparison of relevant electrical
properties of lithium batteries

| Test item | Example 4 | Comparative Example |
|---|---|---|
| Lithium battery internal resistance/mΩ | 0.05 | 0.2 |
| Lithium battery capacity retention/% (after more than 20 cycles) | 98-99 | 93-94 |

According to the test results in FIG. 1 and FIG. 2, the lithium battery prepared from the coating slurry with high adhesion and high ionic conductivity of this application has an internal resistance that is much lower than that of the prior art, and shows a capacity retention after 20 cycles that is higher than that of the existing PVDF coating slurry. This is because the coating slurry with PEAE, dispersing agent, wetting agent, and solvent leads to the formation of a uniform PEAE coating on a PE membrane. Through the high ionic conductivity of PEAE, the conductivity of a lithium battery separator is improved. The dispersing agent and the solvent enable the uniform distribution of PEAE, which improves the stability of a lithium battery separator. The wetting agent can solve the problem of excessive surface tension of the coating slurry, which facilitates the coating on a basal membrane and improves the adhesion between the coating slurry and the basal membrane.

In summary, this application provides a coating slurry with high adhesion and high ionic conductivity, a preparation method thereof, and a lithium battery separator. The coating slurry is prepared from PEAE (as a main component), a dispersing agent, a wetting agent, and a solvent, and the coating slurry can be coated on a surface of a basal membrane to form a lithium battery separator, such that PEAE evenly and stably covers a surface of the lithium battery separator. The present disclosure can not only solve the problem that pure PEAE cannot be directly and evenly coated on a separator, but also improve the adhesion and ionic conductivity of a lithium battery separator, resulting in low battery internal resistance and high capacity retention.

Under the inspiration of the above ideal examples of the present disclosure, a skilled person can absolutely make various changes and modifications through the above description content without departing from the scope of the technical idea of the present disclosure. The technical scope of the present disclosure is not limited to the content of the description, which must be determined according to the scope of the claims.

What is claimed is:

1. A coating slurry, comprising the following raw materials in parts by mass:
    a ternary composite conductive adhesive: 1 to 60 parts;
    a dispersing agent: 0.01 to 10 parts;
    a wetting agent: 0.01 to 15 parts; and
    a solvent: 100 parts;
    wherein the ternary composite conductive adhesive is a composite prepared from poly(3,4-ethylenedioxythiophene) (PEDOT), polyethylene oxide (PEO), and polyacrylic acid (PAA) through in-situ polymerization; and
    the PEDOT, the PEO, and the PAA have a mass ratio of 1:(0.5-0.9):(0.6-1.0).

2. A coating slurry, comprising the following raw materials in parts by mass:
    a ternary composite conductive adhesive: 1 to 60 parts;
    a dispersing agent: 0.01 to 10 parts;
    a wetting agent: 0.01 to 15 parts; and
    a solvent: 100 parts;
    wherein the ternary composite conductive adhesive is a composite prepared from poly(3,4-ethylenedioxythiophene) (PEDOT), polyethylene oxide (PEO), and polyacrylic acid (PAA) through in-situ polymerization; and
    the in-situ polymerization comprises:
    dissolving the PEDOT in a sodium polystyrene sulfonate (PSS) aqueous dispersion, adding a PEO powder to obtain a first resulting mixture, and stirring the first resulting mixture at room temperature until the PEO powder is completely dissolved;
    adding solid sodium bisulfite, stirring for dissolution to obtain a second resulting mixture, and heating the second resulting mixture to 70° C.; and
    under a protection of nitrogen, simultaneously dropwise adding an ammonium persulfate (APS) aqueous solution and an acrylic monomer to allow a reaction.

3. A coating slurry, comprising the following raw materials in parts by mass:
    a ternary composite conductive adhesive: 1 to 60 parts;
    a dispersing agent: 0.01 to 10 parts;
    a wetting agent: 0.01 to 15 parts; and
    a solvent: 100 parts;
    wherein
    the ternary composite conductive adhesive is a composite prepared from poly(3,4-ethylenedioxythiophene) (PEDOT), polyethylene oxide (PEO), and polyacrylic acid (PAA) through in-situ polymerization;
    the dispersing agent comprises an organic dispersing agent and/or an inorganic dispersing agent;
    the organic dispersing agent comprises at least one selected from the group consisting of tris(2-ethylhexyl) phosphate (TEHP), sodium dodecyl sulfate (SDS), methylpentanol, cellulose derivatives, polyacrylamide (PAM), guar gum, and fatty acid polyethylene glycol ester;
    the inorganic dispersing agent comprises at least one selected from the group consisting of silicate and alkali-metal phosphate; and
    the alkali-metal phosphate comprises at least one selected from the group consisting of sodium tripolyphosphate (STPP), sodium hexametaphosphate (SHMP), and sodium pyrophosphate.

4. The coating slurry according to claim 1, wherein the wetting agent comprises one or more selected from the group consisting of an anionic surfactant, a nonionic surfactant, and a neutral surfactant.

5. A preparation method of the coating slurry according to claim 1, comprising
    mixing the ternary composite conductive adhesive, the dispersing agent, the wetting agent, and the solvent, and subjecting a resulting mixture to dispersion to obtain the coating slurry.

6. The preparation method according to claim 5, wherein a method for the dispersion comprises at least one selected from the group consisting of stirring by a stirrer, sanding by a sand mill, and ultrasonic vibration.

7. A lithium battery separator, comprising:
    a basal membrane and a coating on the basal membrane, wherein
    the coating is formed by coating the coating slurry of claim 1.

8. The coating slurry according to claim 2, wherein the PEDOT, the PEO, and the PAA have a mass ratio of 1:(0.5-0.9):(0.6-1.0).

\* \* \* \* \*